UNITED STATES PATENT OFFICE.

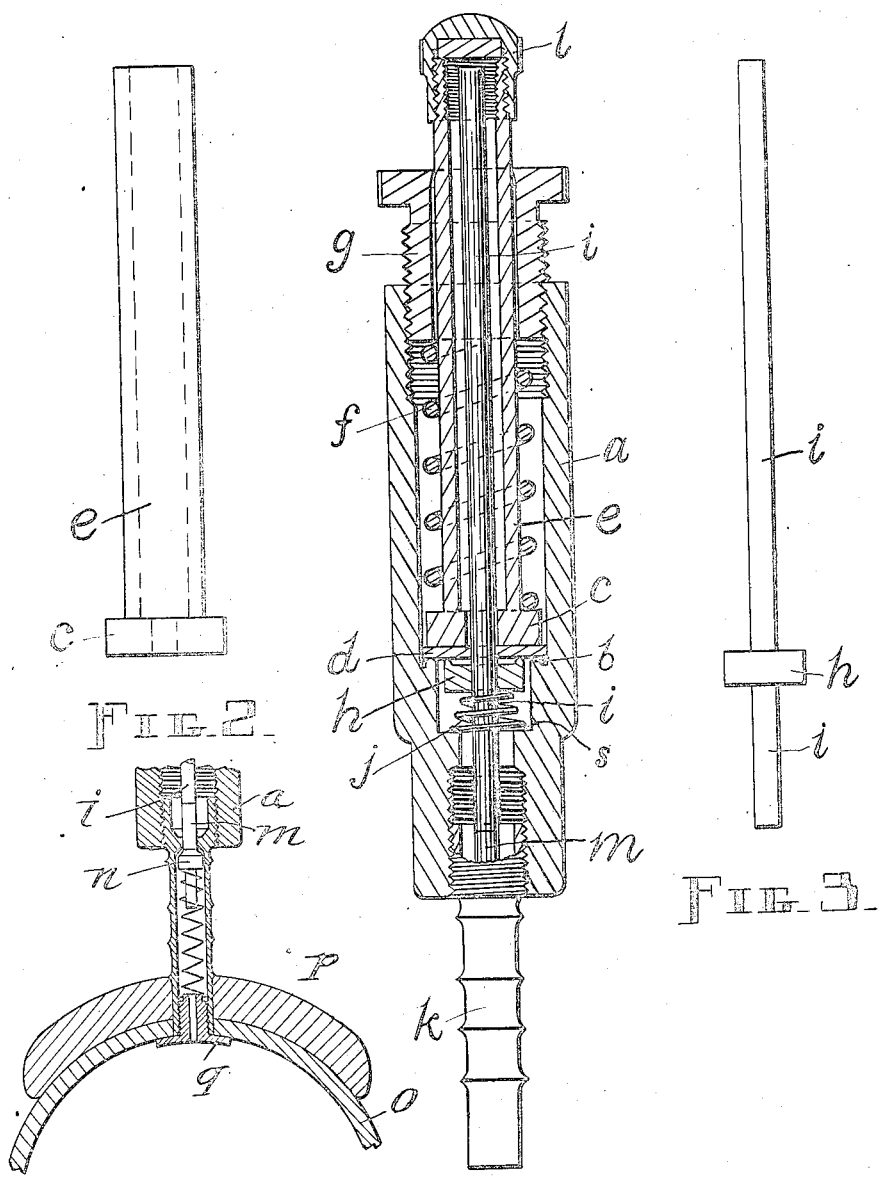

CORNELIUS J. BROSNAN, OF SPRINGFIELD, MASSACHUSETTS, ASSIGNOR OF ONE-HALF TO ALLEN WEBSTER, OF SPRINGFIELD, MASSACHUSETTS.

PRESSURE-REGULATING DEVICE FOR PNEUMATIC TIRES.

961,427.

Specification of Letters Patent. Patented June 14, 1910.

Application filed August 31, 1906. Serial No. 332,810.

*To all whom it may concern:*

Be it known that I, CORNELIUS J. BROSNAN, of Springfield, in the county of Hampden, State of Massachusetts, United States of America, have invented new and useful Improvements in Pressure-Regulating Devices for Pneumatic Tires, of which the following is a specification.

Heretofore it has been found practically impossible to construct a pneumatic tire for automobiles that would not burst under certain conditions which are liable to occur, both in excessive pressure being produced when expanding the tire, and more generally by reason of the excessive pressure developed by reason of the heating of the air in the tire caused by continuous running of the wheel. It is well known that the bursting of a tire while the machine is running is liable to cause serious and dangerous accidents.

The object of my invention is to provide a device which, while being simple in construction, inexpensive in cost of manufacture and reasonably certain of operation, will prevent any excessive pressure in a pneumatic tire so that danger of bursting by reason of excessive pressure may be entirely avoided.

The object of my invention is, further, to provide a device by the employment of which air pressure in a pneumatic tire may be prevented from exceeding a certain predetermined amount, which device may be adjusted to various different pressures.

My object is, further, to provide a device which may be mounted upon the ordinary inlet tube now in common use with pneumatic tires, thus avoiding the expense of placing a new or different tube in position.

I accomplish the objects of my invention by the construction herein described and illustrated in the drawings.

In the accompanying drawings, in which like letters of reference indicate like parts, Figure 1 is a vertical sectional view of the preferred form of embodiment of my invention; Fig. 2 is a view of the outlet valve disk with its hollow stem attached; Fig. 3 is a view of the inlet valve and its stem, and Fig. 4 is a sectional view on a reduced scale of a tire and rim with my device attached thereto, the usual inlet valve being shown in position and held open by the stem of the inlet valve which constitutes one of the new features of said device.

In detail, $a$ indicates an outer shell or case; $b$ a valve seat therein; $c$ a valve disk; $d$ packing arranged between the disk and seat; $e$ a hollow stem attached to the valve disk $c$ and projecting upwardly through the case; $f$ a coil spring; $g$ a regulating plug; $h$ an inlet valve disk; $i$ inlet valve disk stem; $j$ inlet valve spring; $k$ ordinary inlet valve tube in common use with pneumatic tires; $l$ cap.

The construction and operation of my device will be readily understood on reference to the drawings in connection herewith.

In carrying out an embodiment or illustration of my invention, I have shown it as constructed and adapted to be employed in connection with an ordinary inlet valve $n$ and its supporting tube $k$ which is well known and in common use with all pneumatic tires. This tube $k$ is connected with a tire $o$ and a rim or felly $p$ by means of a nipple $q$ or in any other suitable manner.

I provide an outer shell or case $a$, the lower end of which is threaded to engage the thread on the tube $k$. The case $a$ is provided with a spring receiving chamber, as shown, and the lower end of the chamber is provided with a valve seat $b$ which seat I, by preference, construct as shown, as projecting upwardly presenting a narrow circle to engage the packing between it and the valve disk $c$. The valve disk $c$ is provided with a hollow stem $e$ projecting upwardly through the adjusting plug $g$, and a coil spring $f$ is mounted in the case between the valve disk $c$ and the inner end of the adjusting plug $g$ so that the pressure on the valve disk $c$ may be varied by turning the adjusting plug $g$, the latter having screw threaded connection with the case $a$ as shown.

It will now readily be seen that if the conduit be open from the tire chamber to the outlet valve disk $c$, and if the opening through the valve disk $c$ be closed, that then when the pressure in the pneumatic tire exceeds the pressure exerted by the spring $f$ on the valve disk $c$, this disk will be raised from its seat and the air will escape around the valve disk $c$, between it and the inside face of the case $a$, and outwardly between the plug $g$ and the stem $e$. For convenience in forcing air into the tire I provide a supplementary valve comprising a valve disk *h* having a valve seat or ring projecting upwardly, and which valve disk *h* is provided with a stem *i* projecting upwardly through the opening in the stem *e*, and downwardly through the opening in the case below the valve disk, the upward projection being designed to enable one to open the valve by forcing downwardly upon the stem *i*, and the downward projection below the disk *h* being designed to engage the stem of the valve *n* in the tube *k*, and while I might remove the valve mechanism entirely from the tube *k* I prefer for several reasons to leave the valve mechanism in the tube *k* and to project the stem *i* downwardly a sufficient distance so that when the case *a* is in place the lower end of the stem *i* will bear against the stem *m*, it being the stem attached to said valve *n*, and hold this valve open as illustrated in Fig. 4 during the time the case *a* is in position. The spring *j*, which normally retains the disk *h* against the side of the disk *c*, is interposed between said disk *h* and a shoulder *s* in the case *a*, the base of said spring bearing on said shoulder and the top of said spring bearing against the bottom of the disk *h*. When, however, the case *a* is removed, even if the tire be expanded and under pressure, the valve in the tube *k* will operate to prevent the escape of the air from the tire so that the additional labor of forcing air into the tire will be avoided and the pressure will not be materially reduced because of the removal of my safety appliance.

The outer end of the tubular stem *e* is threaded to receive the thread of an ordinary air pump, or other air conduit, and when it is desired to introduce air into the tire *o* the cap *l* is removed, the air conduit connected to the hollow stem *e*, and upon pressure being applied the air will be forced down through the hollow stem *e* forcing the valve disk *h* away from its seat, thus providing an opening for the passage of the air through the conduit *k* into the tire chamber. It will be seen, however, that when the pressure in the tire exceeds the pressure exerted by the coil spring *f* against the valve disk *c* that this valve disk will be raised from its seat and the surplus will escape around the disk and out through the opening in the adjusting plug *g* so that if the plug *g* be screwed down so as to cause the spring to exert a certain pressure upon the outlet valve disk *c* then no greater pressure can be forced into the tire, and danger from excessive pressure will therefore be completely avoided. It will also be seen that if the tire, when cool and not in use, be expanded with a certain air pressure, using for illustration eighty pounds to the square inch which is quite common, and then the machine be run until the tire becomes heated and the air in the tire is heated and expanded notwithstanding the fact that the pressure increases very rapidly under those circumstances, danger of bursting the tire will be avoided because of the fact that the excess above eighty pounds will cause the raising of the valve disk *c* from its seat and allow the excess to escape as before described so that danger of rupture of the tire by reason of excessive pressure will at all times be avoided.

I prefer to employ soft rubber as a packing between the valve disks and the seat.

It will readily be seen that the shape of the parts and details of construction in various and many respects may be altered without departing from my invention. I do not therefore limit myself to the details of construction herein illustrated, but simply employ the same as illustrating one embodiment of, and as at present advised, the best form of construction.

Having therefore described my invention, what I claim and desire to secure by Letters Patent, is—

1. The combination, with a wheel having a pneumatic tire, an inlet valve connected with the tire, a supplementary inlet valve arranged to hold the first inlet valve open while the supplementary inlet valve is in place, an outlet valve, and a spring to hold the outlet valve closed.

2. The combination, with a wheel and pneumatic tire, of a tube connected with said tire having an inlet valve therein, and a case mounted on said tube and having an inlet and an outlet valve therein, the inlet valve stems being contiguous and the inlet and outlet valves in the case being contiguous.

3. The combination, with a wheel having a pneumatic tire, of a suitable case connected with the tire chamber, an outlet valve mounted in said case, an inlet valve mounted on the outlet valve disk, a spring to force the outlet valve upon its seat, means to regulate the pressure on said spring, and a spring to force the inlet valve disk against the outlet valve disk.

4. A safety valve device for pneumatic tires, comprising a suitable case having a valve seat *b* therein provided with an annular channel, a spring-pressed outlet valve disk forming a combination valve and valve seat adapted to rest on said first-mentioned seat and having a hollow stem *e* connected therewith projecting outwardly and having a central opening therethrough, an inlet valve disk *h* mounted on the inner face or seat of the outlet valve disk, a rod connected with the inlet valve disk and movable therewith, and a spring as *j* to force the inlet valve disk normally to its seat, said inlet valve being movable inwardly against the force of its spring by pressure on the outer end of said rod as well as by pressure of air when the same is forced into the stem, substantially as shown.

5. In a safety valve device for pneumatic tires, the combination with a tire, of an outlet valve and a spring therefor, means to vary the pressure of the spring, a conduit leading from the outlet valve to the interior of the tire, an inlet valve mounted to bear against the lower or inner face of the outlet valve disk, a spring arranged to force the inlet valve disk against the outlet valve disk, and a rod connected with the inlet valve disk from which it projects downwardly or inwardly and also passes through the outlet valve disk, said rod being free to move with the inlet valve when opened for the passage of air into the tire and to move also with the inlet valve disk when it and the outlet valve move together to allow the escape of air outwardly.

6. A safety valve device for pneumatic tires, comprising a suitable case having a valve seat $b$ therein provided with an annular channel, a spring-pressed outlet valve disk having a soft packing adapted to rest on the rim of said channel, a hollow stem $e$ extending outwardly from one side only of said disk, an inlet valve disk $h$ having an annular rim, a spring arranged to hold said disk $h$ with its rim against said packing, and a rod connected with the inlet valve disk and extending beyond both faces thereof.

CORNELIUS J. BROSNAN.

Witnesses:
ALLEN WEBSTER,
JOSEPHINE M. STERNS.